United States Patent [19]

Lavoie et al.

[11] Patent Number: 5,331,025
[45] Date of Patent: Jul. 19, 1994

[54] COATING COMPOSITIONS INCORPORATING COMPOSITE POLYMER PARTICLES

[75] Inventors: Alvin C. Lavoie, Lansdale; Jen-Chi Chen, Morrisville; Chao-Jen Chung, North Wales; Dennis P. Lorah, Lansdale; Peter R. Sperry, Doylestown; Andrew W. Gross, Hatboro, all of Pa.

[73] Assignee: Rohm and Haas Company, Philadelphia, Pa.

[21] Appl. No.: 971,365

[22] Filed: Nov. 4, 1992

[51] Int. Cl.$^5$ .......................... C08K 5/01; C08L 63/02
[52] U.S. Cl. .................................. 523/437; 523/511; 523/522; 523/523; 525/64
[58] Field of Search ............... 523/511, 522, 523, 437; 525/64

[56] References Cited

U.S. PATENT DOCUMENTS

| | | |
|---|---|---|
| 4,180,489 | 12/1979 | Andrew et al. . |
| 4,220,679 | 9/1980 | Backhouse . |
| 4,268,547 | 5/1981 | Backhouse . |
| 4,290,932 | 9/1981 | Wright et al. . |
| 4,294,735 | 10/1981 | Bentley et al. ........................ 524/513 |
| 4,336,177 | 6/1982 | Backhouse et al. .................. 523/201 |
| 4,413,073 | 11/1983 | Gibson et al. ......................... 523/511 |
| 4,414,357 | 11/1983 | Wright et al. . |
| 4,833,208 | 5/1989 | Miyazono et al. . |
| 4,849,480 | 7/1989 | Antonelli et al. . |
| 4,863,990 | 9/1989 | Chiou et al. . |
| 5,102,925 | 4/1992 | Suzuki et al. . |

FOREIGN PATENT DOCUMENTS

| | | |
|---|---|---|
| 1242054 | 8/1971 | United Kingdom . |
| 2170810 | 2/1985 | United Kingdom . |

Primary Examiner—Melvyn I. Marquis
Assistant Examiner—David Aylward
Attorney, Agent, or Firm—Wendy A. Taylor

[57] ABSTRACT

This invention relates to a non-aqueous coating composition and a method for reducing the drying time of a non-aqueous coating composition by incorporating composite polymer particles having a softer, insoluble first stage and a hard second stage without adversely affecting the viscosity and pot life of the liquid coating composition and without degrading the properties of the final dry coating, including color, flexibility, impact resistance, gasoline resistance, salt spray resistance and humidity resistance.

20 Claims, No Drawings

COATING COMPOSITIONS INCORPORATING COMPOSITE POLYMER PARTICLES

FIELD OF THE INVENTION

This invention relates to a non-aqueous coating composition and to a method for reducing the drying time of a non-aqueous composition without decreasing pot life and embrittling and discoloring the final dry coating by incorporating into the composition composite polymer particles having a high glass transition temperature second stage polymer and an insoluble first stage polymer with a glass transition temperature less than that of the second stage polymer.

BACKGROUND OF THE INVENTION

Resin manufacturers and coating formulators are reducing the volatile organic content (VOC) of their products for safety, health and environmental reasons. One way to reduce VOC is to reduce or eliminate the solvent used to thin the coating composition to a useable viscosity. To do this, the molecular weight of the film-forming polymer binder used in the coating composition must be reduced to compensate for the attendant viscosity increase experienced when the solvent level is reduced. A coating composition with a lower molecular weight binder requires less solvent to thin it to the appropriate application viscosity and, thus, can be formulated at higher solids and lower VOC.

Coating compositions and their constituent binders, which typically have solids contents of about 40% to about 100% by weight, have been labelled "high solids." The low molecular weight polymers in such high solids coatings are typically designed to undergo a crosslinking reaction after the coating is applied to the substrate in order to increase the molecular weight of the polymeric coating and to produce a hard, durable protective finish.

Examples of these non-aqueous coatings include, but are not limited to, alkyd, polyester, isocyanate, polyurethane, epoxy, melamine, urea and acrylic solution polymers and like resins.

For example, to achieve higher solids levels and lower VOC at the same application viscosity of traditional alkyds, alkyd resin manufacturers typically lower the molecular weight of the alkyd resins. Thus before they become dry and tack free, high solids alkyds must undergo more oxidative crosslinking than conventional alkyds.

The long drying time required for high solids coating compositions is a major shortcoming. Various modifiers for high solids coatings aimed at reducing drying time are commercially available. Most of the current modifiers are high glass transition temperature ($T_g$), low molecular weight solution polymers used to replace a portion of the film-forming polymer in the coating. The high $T_g$ of the modifier speeds up the drying time of the coating, and its low molecular weight does not change the viscosity of the coating composition at a given VOC. Modification with these high $T_g$, low molecular weight modifiers, however, typically degrades the mechanical properties of the final coating, such as for example by reducing impact resistance and flexibility, and degrades the resistance of the final coating to organic solvents.

Another method for reducing drying time is to add a higher level of metal dryer salt to the coating composition, such as for example, cobalt, magnesium and manganese naphthenate and octoate. Higher levels of these salts, however, degrade and discolor the coating over time.

Thus, there is a need for a modifier to accelerate the drying time of the coating:

(1) without increasing the viscosity of the liquid coating composition;
(2) without decreasing the pot life of the liquid coating composition;
(3) without degrading the properties of the final dry coating;
(4) minimizing the loss of flexibility of the coating, caused by the incorporating of particles; and
(5) without discoloring of the final dry coating.

DESCRIPTION OF THE PRIOR ART

Polymeric additives have been used to modify the rheological and end use properties of coating compositions. However, many of these additives are not designed to remedy the particular problems of high solids systems. For example, U.K. Patent 1,242,054 relates to liquid coating compositions that contain film-forming polymer and dispersed rubbery particles; the particles are incorporated to modify the properties of the dried coating. The compositions form dry coating compositions in which the rubbery particles remain in dispersion and adhere to the film-forming polymer. The rubbery particles have a $T_g$ of less than 0° C.

U.S. Pat. Nos. 4,180,489 ('489), 4,220,679 ('679) and 4,268,547 ('547), all relate to spray application of protective and decorative coating compositions to surfaces, particularly to automobile bodies. They disclose a coating composition containing a film-forming polymer; a volatile organic solvent for the film-forming polymer; dispersed polymer microparticles that are insoluble in the composition; and, optionally, pigment particles. Preferably, the polymer microparticles are prepared by dispersion polymerization of monomers in an organic solvent in which the resulting polymer is insoluble and in the presence of a steric stabilizer for the particles. It is also disclosed that the microparticles are associated with auxiliary polymer that is soluble in the solvent and compatible with the resin. This association is achieved by following up the polymerization of the initial microparticles with the polymerization of further monomer in the original solvent and in the presence of the initial stabilizer. The '547 patent is directed to a process for the production of a spray-applied surface coating using the coating composition as described above in which the film-forming polymer is a polyester resin. The presence of microparticles is taught to improve the spray application properties of the resin. The '489 patent is directed to the above-described coating composition in which the pigment particles are metallic flakes. Incorporation of microparticles is disclosed as providing improved control of the orientation of the pigment. The '679 patent teaches a process for producing a multilayer coating in which microparticles are used in a pigmented base-coat composition.

U.S. Pat. No. 4,336,177 relates to the production of stable dispersions of composite crosslinked polymer particles in non-aqueous media. The dispersion is useful in modifying the rheological properties of coating compositions and the physical properties of the final coatings. The first step in forming the non-aqueous dispersion is to polymerize one or more ethylenically unsaturated monomers, including at least one crosslinking monomer, in an aqueous medium (water plus monomer solvent) in the presence of a steric stabilizer. The second step is to polymerize additional ethylenically unsaturated monomer, not containing any crosslinking monomer, to form the polymer of the non-crosslinked outer layer. Finally, the polymer particles are transferred from the resulting dispersion into a non-aqueous liquid that is a solvent of the non-crosslinked polymer.

U.S. Pat. No. 4,863,990 discloses compositions of film-forming solution polymers and microgel particles in which the microgels are chemically grafted to the film-forming polymers and are prepared by an in situ method.

U.K. Patent 2,170,810 relates to coating compositions containing autooxidizable materials as the film-forming constituent along with from 1% to 25% by weight of particulate polymeric material having a $T_g$ of less than 10° C. The particles are added to improve the resistance to aging of the coating composition.

U.S. Pat. No. 4,414,357 relates to a method of making a polyester or alkyd resin composition containing acrylic microgels that is useful in high solids paint systems to provide coatings with improved sag resistance. A microgel is defined as a stable dispersion of polymer microparticles that are crosslinked to the extent that they are insoluble in the organic solvent in which they are dispersed. The resin composition is made by preparing the acrylic microgels by aqueous emulsion polymerization, isolating the microgels by either or both coagulation and azeotropic distillation, and then incorporating the microgels into a polyester or alkyd resin at levels of 5% to 15% by weight of the total resin solids.

U.S. Pat. No. 5,102,925 relates to an air-drying paint composition containing (a) internally cross-linked polymer microparticles produced by emulsion polymerizing ethylenically unsaturated monomers including at least one cross-linking monomer, (b) a film-forming resin selected from the group consisting of an air-drying alkyd resin, an acrylic polymer and an acrylic-modified alkyd resin, and (c) a volatile organic solvent. The paint may be formulated in high solids content while retaining low viscosity.

Efforts at developing modifiers for high solids systems have focused on particles prepared by two-stage processes:

U.S. Pat. No. 4,833,208 is directed to composite acrylic resin particles, useful in high solids coating compositions, made of a particulate crosslinked polymer core to which linear polymer chains are chemically bonded in a high grafting rate. To achieve high grafting rates, the core includes at least one monomer having in its molecule one or more radically polymerizable mono- or 1,1-di-substituted ethylenic unsaturation bonds and one or more radically polymerizable 1,2-di-, 1,1,2-tri, or 1,1,2,2,-tetra-substituted ethylenic unsaturation bonds. The latter unsaturated bonds remain on the surface of the particles following polymerization.

U.S. Pat. No. 4,849,480 relates to crosslinked polymer microparticles useful as rheology control additives for high solids coating compositions. The microparticles contain a crosslinked core prepared by emulsion polymerization of styrene or alkyl (meth)acrylate monomers, a crosslinking monomer of an alkylene glycol di(meth)acrylate or dimethacrylate, and allyl (meth)acrylate. Following the emulsion polymerization, a non-aqueous dispersion of the core particles is formed, and side chains are grafted onto the microparticles by the polymerization in the dispersion of styrene or alkyl (meth)acrylate monomers and hydroxy containing monomers.

All these prior polymer particles designed for use in coating compositions fall short of meeting the requirements of a successful dry time modifier for high solids coatings.

SUMMARY OF THE INVENTION

This invention relates to a non-aqueous coating composition and a method for reducing the drying time of a non-aqueous coating composition by incorporating composite polymer particles having a hard second stage and a softer, insoluble first stage without adversely affecting the viscosity and pot life of the liquid coating composition and without degrading the properties of the final dry coating, including color, flexibility, impact resistance, gasoline resistance, salt spray resistance and humidity resistance.

The method enables resin manufacturers and coating formulators to reduce the volatile organic content (VOC) of their products without increasing the drying time for the coatings and without adversely affecting the viscosity and pot life of the liquid coating composition and without degrading the properties of the final dry coating, including color, flexibility, impact resistance, gasoline resistance, salt spray resistance and humidity resistance.

DETAILED DESCRIPTION OF THE INVENTION

The coating compositions useful in the method of the invention contain a film-forming resin, a volatile organic liquid which is a solvent for the film-forming resin and composite polymer particles.

Film-Forming Resin

The film-forming resin used in the coating composition useful in the method of the present invention may be selected from one or more of:

(1) an alkyd resin;
(2) a polyester resin;
(3) a polyurethane resin;
(4) an epoxy resin;
(5) a melamine resin;
(6) a urea resin;
(7) an acrylic solution resin; and
(8) an isocyanate resin.

Alkyd Resin

The film-forming alkyd resin may be any of the oil-modified alkyd resins that are well known in the art for use in surface coating compositions and that are essentially the reaction product of a polyhydric alcohol, a polybasic acid, and a synthetic or natural oil. The alkyd may be a short-oil, medium-oil, or long-oil alkyd. The alkyd resin may be modified with acrylic resin.

Polyester Resin

Suitable film-forming polyester resins may be any of the reaction products of polyhydric alcohol and dibasic acid, such as those disclosed in U.S. Pat. No. 4,414,357, columns 3–4, which is incorporated herein in pertinent part by reference.

Polyurethane Resin

Suitable film-forming polyurethane resins may be any of the thermoplastic or thermosetting polymers produced by the condensation reaction of a polyisocyanate and a hydroxyl-containing material, such as for example a polyol derived from propylene oxide and trichlorobutylene oxide. Suitable polyurethane resins include those described in *Introduction to Paint Chemistry and Principles of Paint Technology* by G. P. A. Turner (London: Chapman and Hall, 1988), pages 198-212 which are incorporated herein by reference. The polyurethane resin may modified with acrylic resin.

Epoxy Resin

Suitable film-forming epoxy resins may be any of the polymers prepared from epichlorhydrin and a dihydroxy compound, such as for example bisphenol A and dihydric alcohol. Suitable epoxy resins also include epoxy novolac resin, cyclo-aliphatic epoxy resin, acrylic epoxide resin and those epoxidized resins as described in *Introduction to Paint Chemistry and Principles of Paint Technology* by G. P. A. Turner (London: Chapman and Hall, 1988), pages 183-197 which are incorporated herein by reference. "Epoxy resins" as herein described include two pack epoxy systems, such as for example, epoxy resins in conjunction with polyamine resins.

Other suitable film-forming epoxy resins include those made from polyolefins oxidized with peracetic acids and those modified with acrylic resin.

Melamine Resin

Suitable film-forming melamine resins may be any of the polymers prepared from the reaction product of melamine and formaldehyde. Suitable melamine resins also include resins as described in *Introduction to Paint Chemistry and Principles of Paint Technology* by G. P. A. Turner (London: Chapman and Hall, 1988), pages 175-176 which are incorporated herein by reference.

Urea Resin

Suitable film-forming urea resins may be any of the polymers prepared from the reaction product of urea and formaldehyde. Suitable urea resins also include resins as described in *Introduction to Paint Chemistry and Principles of Paint Technology* by G. P. A. Turner (London: Chapman and Hall, 1988), pages 172-175 which are incorporated herein by reference.

Acrylic Solution Resins

Suitable film-forming acrylic solution resins include those thermosetting, ambient curing or thermoplastic acrylic resins prepared by solution polymerization, by techniques well-known in the art.

Isocyanate Resins

Suitable film-forming isocyanate resins include those used in conjunction with polyols in the formulation of urethane coatings, such as for example, hexamethylene diisocyanate, isophorone diisocyanate, the isocyanurate of isophorone diisocyanate and the like.

Volatile Organic Liquid

The volatile organic liquid of the composition may be any of the liquids, or mixtures of liquids, that are conventionally used as polymer solvents in coating compositions including aromatic hydrocarbons such as toluene and xylene and petroleum fractions of various boiling ranges having a significant aromatic content; aliphatic hydrocarbons such as mineral spirits; esters such as butyl acetate, ethylene glycol diacetate, and 2-ethoxyethyl acetate; ketones such as acetone and methyl isobutyl ketone; and alcohols such as butyl alcohol. The actual liquid or mixture of liquids selected as the diluent depends on the nature of the film-forming resin and is chosen according to principles well known in the art so that the resin is soluble in the volatile organic solvent. For example, the more hydrophobic long-oil alkyds are typically supplied in weak solvents such as an aliphatic solvent like mineral spirits. The more polar medium- and short-oil alkyds are usually supplied in strong solvents, such as for example, aromatic hydrocarbons, esters, ketones, alcohols and the like.

Composite Polymer Particles

The composite polymer particles useful in the method of the invention must meet the following requirements:

(1) The particles must be dispersible in the coating composition and not cause an unacceptable increase in the viscosity of the coating solution at a given solids level; the particles must remain well dispersed in the polymer matrix after solvent evaporation.

(2) The particles minimize embrittlement, i.e., loss of flexibility, in the final coating.

It is preferable the composite polymer particles be added to the coating solution as a dry powder to avoid the addition of liquid carrier that subsequently must be removed to achieve high solids levels.

The composite polymer particles useful in the method of the present invention are made of at least two mutually incompatible polymer stages. These mutually incompatible polymer stages may be present in the following morphological configurations, for example, core/shell, core/shell particles with shell stages incompletely encapsulating the core, core/shell particles with a multiplicity of cores, interpenetrating network particles, and the like. In all of these cases the majority of the surface area of the particle will be occupied by at least one outer stage and the interior of the particle will be occupied by at least one inner stage.

The mutual incompatibility of two polymer compositions may be determined in various ways known in the art. For example, scanning electron microscopy using staining techniques to emphasize the difference between the appearance of the phases or stages is one such technique.

The composite polymer particle of this invention shall be described as containing a "first stage" and a "second stage." The "second stage" as used herein does not mean to exclude the possibility that one or more polymers can be interposed between or formed on the first stage copolymer and before the second stage copolymer. Nor does the use of the terms "first" and "second" denote the sequence in which the stages are polymerized.

The composite polymer particle is formed from a first stage polymer in an amount from about 50% to about 90% by weight of the composite polymer particle and from a second stage polymer in an amount from about 10% by weight to about 50% by weight of the composite polymer particle. Preferably, the amount of the first stage polymer is from about 65% by weight to about 85% by weight of the composite polymer particle, and the amount of the second stage polymer is from about 15% by weight to about 35% by weight of the composite polymer particle.

The composite polymer particles can be prepared by conventional emulsion polymerization techniques well known in the art, such as, for example, sequential emulsion polymerization processes as in U.S. Pat. Nos. 4,325,856; 4,654,397; and 4,814,373 which are hereby incorporated herein by reference.

Adjuvants useful in the preparation of the composite polymer particles of this invention and/or in their subsequent use and which may be added during or subsequent to the polymerization reaction may include auxilliary surfactants; defoamers such as, for example, Surfynol 104E and Nopco NXZ used at a level of from about 0.001 to about 0.1% by weight based on the weight of the total monomer mixture; levelling agents such as, for example, Sag ® Silicone Antifoam 47 used a level of from about 0.001 to about 0.01% by weight based on the weight of the total monomer mixture; antioxidants; oxidation-reduction couples to cause further reaction such as, for example, t-butyl hydroperoxide and sodium formaldehyde sulfoxylate; emulsion stabilizers and protective colloids such as, for example, polyacrylic acid polymers, hydroxyethyl cellulose, methyl cellulose and polyvinyl alcohol; preservatives such as, for example, Kathon ® LX and Proxel ® CRL used at a level of 5–250 ppm and the like.

The particle size of the composite polymer particles is typically in the range from about 100 nanometers to about 550 nanometers (nm), preferably from about 250 nm to about 500 nm. Composite polymer particles with diameters of less than about 100 nm are difficult to disperse in coating compositions and produce coating compositions with unacceptably high viscosities and excessive grit. With diameters of more than about 550 nm, the composite polymer particles reduce the gloss and, in clear films, cause haziness in the final dry coating.

First Stage Polymer

The first stage polymer must meet the following requirements:
 (1) insoluble and resistant to swelling in the film-forming resin and volatile organic solvent;
 (2) minimize embrittlement in the final coating; and
 (3) not interfere with the dispersibility of the composite polymer particles in the coating composition.

The insolubility and resistance to swelling of the first stage polymer in the coating composition may be achieved in several ways. One way is to select the composition of the first stage polymer such that the polymer is inherently insoluble in the coating composition. A second, preferred method of obtaining solvent resistance is by introducing crosslinking into the first stage polymer. By using crosslinking to produce the solvent resistant first stage polymer, the composition of the polymer may be such that, if the polymer were not crosslinked, the polymer would be soluble in the coating composition. For example, polybutyl acrylate, which would normally be soluble in alkyd-solvent solutions, may be rendered insoluble by introducing crosslinking.

The first stage polymer may be crosslinked by incorporating a polyfunctional monomer into the polymer. The amount of polyfunctional monomer used in the first stage polymer is determined in part by the need to optimize rheological and mechanical properties of the coating composition in which the composite polymer particle is ultimately used. As the crosslinking density of the particle is increased, the particle becomes less susceptible to swelling by solvent. Solvent swelling of the composite polymer particle increases the viscosity of the coating composition in which the particle is used. The viscosity of the coating composition decreases as the percentage of polyfunctional monomer in the first stage polymer increases. However, as the extent of crosslinking increases, the composite polymer particle becomes harder and less flexible, and the flexibility and impact resistance of the final coating decrease.

Preferably, the amount of polyfunctional monomer used in the first stage polymer is in the range from about 3% by weight to about 10% by weight of the first stage monomers. When levels below 3% by weight are used, the composite polymer particles result in coating compositions with viscosities that are too high to provide for good flow and leveling of the composition. Particles incorporating polyfunctional monomer levels above 10% by weight are difficult to disperse in the coating compositions. The preferred amount of polyfunctional monomer is from about 5% by weight to about 8% by weight of the first stage monomers.

"Polyfunctional monomer" as used herein refers to a polyfunctional monomer or mixture of monomers which crosslinks a polymer composition during the initial formation thereof. Subsequent drying or other curing techniques are not required. Monomers of this type are well-known and include monomers wherein the functionality is of substantially equivalent reactivity so that uniform crosslinking occurs. Typically, such monomers contain at least two addition polymerizable vinylidene groups and are $\alpha,\beta$-ethylenically unsaturated monocarboxylic acid esters of polyhydric alcohols containing 2–6 ester groups. Suitable polyfunctional monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate, propylene glycol diacrylate and triethylene glycol dimethylacrylate; 1,3-glycerol dimethacrylate; 1,1,1-trimethylolpropane dimethacrylate; 1,1,1-trimethylolethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, hexatriene, diallyl cyanamide, ethylene glycol divinyl ether, diallyl phthalate, divinyl dimethyl silane, glycerol trivinyl ether, divinyl adipate and the like.

"Polyfunctional monomer" as used herein also refers to a polyfunctional monomer wherein the functionality has different reactivity. This results in a portion of the functionality entering into the formation and crosslinking of the first stage polymer with the remaining functionality being pendant from the first stage polymer and capable of further reacting with suitable functionality in the second stage monomer composition to graft the second stage upon the first stage polymer. Typically, the polyfunctional monomers have at least two copolymerizable ethylenically unsaturated bonds which react at substantially different rates and comprise allyl esters of $\alpha,\beta$-unsaturated mono- and dicarboxylic acids having terminal ethylenic unsaturation. Useful esters include allyl methacrylate, allyl acrylate, diallyl maleate, diallyl fumarate, diallyl itaconate, triallyl isocyanurate and the like.

Preferred polyfunctional monomers are allyl (meth)acrylate, diallyl phthalate, diallyl maleate, and triallyl isocyanurate. Most preferred is allyl methacrylate.

The first stage polymer of this invention does not further embrittle the final dry coating. The monomers used to prepare the first stage polymer are selected to yield polymer having a $T_g$ of less than the $T_g$ of the second stage polymer, hereinafter referred to as "low $T_g$." Preferably, the first stage polymer has a $T_g$ of less than about 0° C. The $T_g$ of the polymer stages may be calculated using the Fox equation [Bulletin of American Physics Society 1, 3, page 123 (1956)]:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers and $T_{g(1)}$ and $T_{g(2)}$ refer to the glass transition temperatures of the two corresponding homopolymers.

The first stage polymer is formed from at least one ethylenically unsaturated monomer selected to yield polymer having a $T_g$ of less than the $T_g$ of the second stage polymer. Preferably, the ethylenically unsaturated monomers used to prepare the first stage polymer include at least one (meth)acrylate monomer and at least one monomer having acid functionality. As used herein, the expression "(meth)acrylate" encompasses both "methacrylate" and "acrylate."

Useful monomers include acrylic ester monomers, including methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate and the like; styrene, substituted styrenes, butadiene, acrylonitrile, ethylene, vinyl acetate, vinyl chloride and the like may be used.

Useful monomers containing acid functionality include (meth)acrylic acid, (meth)acryloxypropionic acid, itaconic acid, aconitic acid, maleic acid or anhydride, fumaric acid, crotonic acid, monomethyl maleate, monomethyl fumarate, monomethyl itaconate and acid salts, such as for example the ammonium acid salt and sodium acid salt. Preferred acid monomers are acrylic and methacrylic acid. The amount of acid monomer used in the first stage polymer is in the range from about 0.1% to about 4% by weight of the first stage monomers.

Preferred monomers include (meth)acrylate monomers, such as alkyl (meth)acrylates having 1 to 12 carbon atoms in the alkyl groups. It is more preferred that one of the alkyl (meth)acrylates included in the first stage polymer be a $C_2$ to $C_4$ alkyl acrylate, and most preferably, butyl acrylate. The acrylate monomers are typically included in amounts greater than about 80% by weight of the first stage monomers.

The ethylenically unsaturated monomers used to prepare the first stage polymer may also include minor proportions of one or more functional monomers having other than acid functionality, such as for example, hydroxy- or amino-functionality. Typical hydroxy-containing monomers useful in the first stage polymer include hydroxy alkyl (meth)acrylates, such as hydroxyethyl (meth)acrylate, hydroxypropyl (meth)acrylate, and hydroxybutyl (meth)acrylate and alkyloxy (meth)acrylates, such as methoxyethyl acrylate. Hydroxyethyl methacrylate is preferred. Typical amino-containing monomers useful in the first stage polymer include t-butylaminoethyl (meth)acrylate and dimethylaminoethyl (meth)acrylate. The total amount of functional monomers having other than acid functionality that may be used is less than about 40% by weight of the first stage monomers, with less than about 15% by weight preferred.

The composition of the first stage polymer also affects the dispersibility of the composite polymer particles in the coating composition. We have discovered that composite polymer particles having crosslinked first stage polymer that would, without crosslinking, be soluble in the coating composition can be dispersed more readily in the coating composition than first stage polymer prepared from monomers that are inherently insoluble in the film-forming resin-solvent solution.

Second Stage Polymer

The composition of the second stage polymer is selected to provide the composite polymer particles with an outer surface that enables the particles to be dispersed in, and to be compatible with, the film forming resin-solvent solutions and the dried coatings. The level of dispersibility of composite polymer particles in a coating composition may be quantitatively determined by comparing the viscosity of the composition before and after the incorporation of the composite polymer particles, with a significant increase in viscosity indicating poorer dispersibility. The level of dispersibility of composite polymer particles in a coating composition may also be quantitatively determined by comparing the gloss of the dry film with and without composite polymer particles, with a significant decrease in gloss because of the incorporation of composite polymer particles indicating poorer dispersibility. In addition, the level of dispersibility of the composite polymer particles in a coating composition may be qualitatively determined by the formation of a uniform mixture of the composite polymer particles in the coating composition and by the lack of formation of grit in the final dry coating. Poorly dispersible composite polymer particles are difficult to admix with the other components of the coating composition and they also show the formation of grit in the final dry coating.

The monomers used to prepare the second stage polymer are selected to yield a polymer having a $T_g$ of greater than about 40° C., hereinafter "high $T_g$." Particles having second stage polymer with a $T_g$ less than about 40° C. cannot be isolated by spray drying, the dry powders have poor storage stability and are difficult to disperse in the coating composition.

The second stage polymer is formed from at least one ethylenically unsaturated monomer. Useful ethylenically unsaturated monomers include alkyl or cycloalkyl (meth)acrylates such as isobutyl methacrylate, ethyl methacrylate, 2-ethylhexyl methacrylate, isodecyl methacrylate, isobornyl methacrylate, dicyclopentadienyl methacrylate, cyclohexyl methacrylate, benzyl methacrylate, phenyl methacrylate, and the like; styrene, 3-methyl styrene, 4-methyl styrene, 4-t-butyl styrene, 2-chlorostyrene, 2,4-dichlorostyrene, 2,5-dichlorostyrene, 2,6dichlorostyrene, 4-chloro-2-methyl styrene, 4-chloro-3-fluorostyrene, vinyl toluene and the like. Alkyl or cycloalkyl methacrylates having 4 to 12 carbon atoms in the alkyl or cycloalkyl groups are preferred. Isobutyl methacrylate, 2-ethylhexyl methacrylate, isodecyl methacrylate, and isobornyl methacrylate are more preferred.

The ethylenically unsaturated monomers used to prepare the second stage polymer may also include minor proportions of one or more functional monomers, such as for example, hydroxy-, carboxy- and amino-functionality. Typical hydroxy-containing monomers useful in the second stage polymer include hydroxy alkyl (meth)acrylates such as hydroxyethyl (meth)acrylate, hydroxypropyl (meth)acrylate, and hydroxybutyl (meth)acrylate. Hydroxyethyl methacrylate is preferred. Typical amino-containing monomers useful in the second stage polymer include t-butylaminoethyl (meth)acrylate and dimethylaminoethyl (meth)acrylate. Typical carboxy-containing monomers useful in the second stage polymer include(meth)acrylic acid, (meth)acryloxypropionic acid, itaconic acid, aconitic acid, maleic acid or anhydride, fumaric acid, crotonic acid, monomethyl maleate, monomethyl fumarate, monomethyl itaconate and acid salts, such as for example the ammonium acid salt and sodium acid salt. Preferred acid monomers are acrylic and methacrylic acid.

The total amount of monomers having functionality that may be used is less than about 40% by weight of the second stage monomers, with less than about 15% by weight preferred.

Chain transfer agents, such as, for example, mercaptans and polymercaptans, such as n-dodecylmercaptan, 2-mercaptoethanol, butyl mercaptopropionate, and methyl mercaptopropionate, and halogen compounds, are sometimes desirable in the polymerization mixture of second stage to moderate the molecular weight of the latex polymer. Generally, from about 0.1% to about 3%, by weight of the chain transfer agent, based on the weight of the total monomer mixture for the second stage, may be used.

Optionally, crosslinking may be introduced into the second stage polymer by including in the second stage monomers at least one monomer that is polyfunctional with respect to the polymerization reaction. Preferred polyfunctional monomers that may be used include allyl (meth)acrylate, diallyl phthalate, diallyl maleate, and triallyl isocyanurate. Most preferred is allyl methacrylate. The amount of polyfunctional monomer optionally included in the second stage is in the range from about 0% to about 3% by weight of the second stage monomers.

The composite polymer particles can be incorporated into the coating solution in various ways. The particles can be isolated from the aqueous emulsion polymerization to form dry powder by any suitable technique including, but not limited to, lyophilization, coagulation and subsequent drying or, preferably, spray drying. The particles may also be isolated by tray drying or rotary drum drying. If necessary, the particles may be ground or pulverized into a desired particle size using a conventional mill. The powder can then be added directly to the coating composition by stirring or milling the powder into the liquid coating composition. Alternatively, the aqueous emulsion containing the particles can be added directly to the coating composition. The water is then optionally removed by azeotropic distillation as in U.S. Pat. No. 4,414,357 which is incorporated herein in pertinent part by reference or by solvent substitution with an volatile organic solvent.

The amount of composite polymer particles in the final coating composition is typically in the range from about 10% to about 40% by weight of the total binder solids and, preferably, from about 20% to about 35% by weight of the total binder solids. Coating compositions containing greater than about 40% by weight of the total binder solids increase the viscosity of the liquid composition and decrease gloss of the final coating. "Total binder solids" is the total weight of the film-forming resin and the composite polymer particles. Typically, the total solids content, including the binder and other additives such as for example pigments and driers, of the final coating composition is in the range from about 50% to about 95% by weight and, preferably, from about 60% to about 90% by weight.

The coating composition may also incorporate other additives conventionally used in the coating art, such as for example, pigments, dispersants, ultraviolet radiation absorbers, thickeners, rheology modifiers and metal dryers. A particular advantage of the composition of the present invention is that, because the composite polymer particles reduce the drying time of the coating composition, it is possible to use lower levels of the metal dryers conventionally used in coating compositions.

There may also be incorporated into the coating composition a separate crosslinking resin to assist the curing of the film-forming resin. Suitable types of crosslinking resins include diisocyanates, diepoxides, and melamine-formaldehyde and urea-formaldehyde condensates.

The coating composition containing the composite polymer particles can be applied to a substrate using any of the methods well known in the coatings art, such as for example, by spraying, dipping, brushing, and the like. The coating may by allowed to dry either at room temperature or by heat treatment at elevated temperatures.

The coating composition and method are not limited to solvent-based coatings useful as paints but also include any solvent-based composition which needs reducing drying time, such as for example, sealer cements and the like, without the degrading the other final dried properties.

The following examples are intended to illustrate the invention; they are not intended to limit the invention as other applications of the invention will be obvious to those of ordinary skill in the art.

EXAMPLE 1.

Preparation of Polymer Composite Particles

Polymer composite particles odl1–odl9 are two-stage polymers which were prepared by a conventional redox emulsion polymerization process.

The quantity of each ingredient which was added is shown in Table 1.1. To prepare stage I, monomer emulsion I was prepared by mixing the appropriate monomers with water and sodium dodecyl benzene sulfonate (SDBS) according to Table 1.1. Water, ferrous sulfate heptahydrate (FeSO$_4$.7 H$_2$O [0.1%]) and ethylenediaminetetraacetic acid tetrasodium salt (EDTA [1.0%]) were charged to the reaction kettle and heated to 60° C. A polymer seed was added. The monomer emulsion I and 80–90% of the catalyst cofeed was fed into the reaction kettle over 1.5 hours, maintaining the temperature at 60° C. After completion of stage I, the pH was adjusted to 8-8.5 with an ammonium hydroxide solution. To prepare stage II, monomer emulsion II was prepared by mixing the appropriate monomers with water and sodium dodecyl benzene sulfonate (SDBS) according to Table 1.1. Monomer emulsion II was fed into the reaction kettle over 1.5 hours, maintaining the temperature at 65° C. The remaining catalyst cofeed was uniformly fed as a separate steam concurrently with the additions of monomer emulsions I and II. After the feeds were completed, the reaction kettle was held for 20 minutes. The reaction was cooled to room temperature and neutralized, if necessary, to a final pH of 8-8.5 with an ammonium hydroxide solution.

The composite polymer particles were then isolated either by spray drying or by freeze drying:

Spray Drying

The composite polymer particles were isolated by spray drying using a Bowen Model BLSA laboratory spray drier. The inlet temperature was adjusted to 125° C. and then the feed rate was adjusted to give an outlet temperature of 55° C.

All composite polymer particles were isolated by spray drying, unless otherwise noted. The suffix "-sd" indicates a composite polymer particle was isolated by spray drying.

Freeze Drying

The composite polymer particles were isolated by freeze drying using a Labconca Freeze Dry 8 Model 75040. The freeze dryer was run at less than about 40° C. under a vacuum of less than about 25 microns (0.025 Torr) for 16-24 hours or until less than about 0.5% moisture was present. The material was then ground either in a high shear grinder or with a mortar and pestle.

The suffix "-fd" indicates a composite polymer particle was isolated by freeze drying.

The compositions and final properties of the composite polymer particles are shown in Table 1.2.

TABLE 1.1

| | Composite Polymer Particles | | | | | | | | |
|---|---|---|---|---|---|---|---|---|---|
| | od11 | od12 | od13 | od14 | od15 | od16 | od17 | od18 | od19 |
| Kettle Charge | | | | | | | | | |
| Water | 800 | 700 | 700 | 700 | 700 | 700 | 700 | 700 | 700 |
| $FeSO_4.7H_2O$ [0.1%] | 17 | 17 | 17 | 17 | 17 | 17 | 17 | 17 | 17 |
| EDTA [1.0%] | 2.4 | 2.4 | 2.4 | 2.4 | 2.4 | 2.4 | 2.4 | 2.4 | 2.4 |
| Monomer Emulsion I (ME I) | | | | | | | | | |
| Water | 700 | 700 | 700 | 700 | 700 | 700 | 700 | 700 | 700 |
| SDBS [23.0%] | 60 | 60 | 60 | 60 | 60 | 60 | 60 | 60 | 60 |
| BA | 1306 | 1095.4 | 1095.4 | 1095.4 | 1095.4 | 1095.4 | 1095.4 | 1095.4 | 1142.8 |
| HEMA | 0 | 210.6 | 210.6 | 210.6 | 210.6 | 210.6 | 210.6 | 210.6 | 0 |
| ALMA | 84.2 | 84.2 | 84.2 | 84.2 | 84.2 | 84.2 | 84.2 | 84.2 | 73.7 |
| MAA | 14.2 | 14.2 | 14.2 | 14.2 | 14.2 | 14.2 | 14.2 | 14.2 | 12.3 |
| Polymer seed | 20 | 20 | 20 | 20 | 20 | 20 | 20 | 20 | 20 |
| Monomer Emulsion II (ME II) | | | | | | | | | |
| Water | 170 | 170 | 170 | 170 | 170 | 170 | 170 | 170 | 170 |
| SDBS | 8.5 | 8.5 | 8.5 | 8.5 | 8.5 | 8.5 | 8.5 | 8.5 | 8.5 |
| IBMA | 210.6 | 0 | 0 | 0 | 0 | 0 | 0 | 0 | 316 |
| IBOMA | 129.8 | 0 | 0 | 0 | 0 | 0 | 105.3 | 115.8 | 194.8 |
| t-BAEMA | 10.6 | 0 | 0 | 0 | 0 | 0 | 0 | 0 | 15.8 |
| BA | 0 | 80.7 | 80.7 | 35.1 | 0 | 0 | 0 | 35.1 | 0 |
| MMA | 0 | 217.6 | 217.6 | 263.3 | 217.6 | 193.1 | 193.1 | 193.10 | 0 |
| BMA | 0 | 0 | 0 | 0 | 80.7 | 0 | 0 | 0 | 0 |
| Styrene | 0 | 0 | 0 | 0 | 0 | 105.3 | 0 | 0 | 0 |
| HEMA | 0 | 52.6 | 52.6 | 52.6 | 52.6 | 52.6 | 52.6 | 45.6 | 0 |
| n-DDM | 3.5 | 3.5 | 0 | 0 | 0 | 0 | 0 | 0 | 5.3 |
| MMP | 0 | 0 | 2.8 | 2.8 | 2.8 | 2.8 | 2.8 | 2.8 | 0 |
| Catalyst Cofeed #1 | | | | | | | | | |
| t-BHP (0.95%) | 224 | 224 | 224 | 224 | 224 | 224 | 224 | 224 | 224 |
| IAA solution (1.85%) | 224 | 224 | 224 | 224 | 224 | 224 | 224 | 224 | 224 |
| Catalyst Cofeed #2 | | | | | | | | | |
| t-BHP (0.95%) | 56 | 56 | 56 | 56 | 56 | 56 | 56 | 56 | 56 |
| IAA solution (1.85%) | 56 | 56 | 56 | 56 | 56 | 56 | 56 | 56 | 56 |

Notes:
BA butyl acrylate
ALMA allyl methacrylate
MAA methacrylic acid
IBMA isobutyl methacrylate
MMA methyl methacrylate
SDBS sodium dodecyl benzene sulfonate
EDTA ethylenediaminetetraacetic acid
IAA isoascorbic acid solution
IBOMA isobornyl methacrylate
tBAEMA t-butylaminoethyl methacrylate
HEMA hydroxyethyl methacrylate
nDDM n-dodecyl mercaptan
BMA butyl methacrylate
$FeSO_4.7H_2O$ ferric sulfate heptahydrate
MMP 3-mercaptopropionate
g grams

TABLE 1.2

| Composition First Stage / Second Stage | Particles Size (mm) | Composite Polymer Particles $T_g$ (°C.) (calculated) First Stage | Second Stage |
|---|---|---|---|
| odl1 80(93BA/6ALMA/1MAA) 20(37IBOMA/60IBMA/3tBAEMA//1nDDM) | 350–400 | −49 | 84 |
| odl2 80(78BA/15HEMA/6ALMA/1MAA) 20(23BA/62MMA/15HEMA//1nDDM) | 350–400 | −38 | 45 |
| odl3 80(78BA/15HEMA/6ALMA/1MAA) 20(23BA/62MMA/15HEMA//0.8BMP) | 350–400 | −38 | 45 |
| odl4 80(78BA/15HEMA/6ALMA/1MAA) 20(10BA/75MMA/15HEMA//0.8BMP) | 350–400 | −38 | 72 |
| odl5 80(78BA/15HEMA/6ALMA/1MAA) 20(23BMA/62MMA/15HEMA//0.8BMP) | 350–400 | −38 | 74 |
| odl6 80(78BA/15HEMA/6ALMA/1MAA) 20(30Styrene/55MMA/15HEMA/0.8BMP) | 350–400 | −38 | 95 |
| odl7 80(78BA/15HEMA/6ALMA/1MAA) 20(30IBOMA/55MMA/15HEMA//0.8BMP) | 350–400 | −38 | 113 |
| odl8 (80(78BA/15HEMA/6ALMA/1MAA) 20(10BA/30IBOMA/45MMA/15HEMA//0.8BMP) | 350–500 | −38 | 86 |
| odl9 70(93BA/6ALMA/1MAA) 30(37IBOMA/60IBMA/3tBAEMA//1nDDM) | 350–400 | −49 | 84 |

EXAMPLE 2
Paint Formulations

Note: All quantities of materials are listed in Tables 2.1–2.8 in grams.

Long-Oil Alkyd (pigmented white)—A

In a Cowles mixer, a grind of long-oil alkyd resin (90% solids in odorless mineral spirits and xylol), titanium dioxide pigment and odorless mineral spirits solvent was mixed at 3000 rpm for 20 minutes.

A premix was made by adding together in a container long-oil alkyd resin (90% by weight solids in odorless mineral spirits and xylol), polymer composite particles (spray dried powder), cobalt naphthenate, zirconium naphthenate, Activ-8 drier accelerator/stabilizer, Exkin-2 anti-skinning agent, odorless mineral spirits and Aromatic 100 solvents and tumbling overnight.

To form the let down, the grind was added to the premix and stirred for 5 minutes under bench stirring.

Long-Oil Alkyd (pigmented white)—B

In a Cowles mixer, a grind of long-oil alkyd resin (75% solids in odorless mineral spirits) and titanium dioxide pigment was mixed at 3000 rpm for 20 minutes.

A premix was made by adding together in a container long-oil alkyd resin (70% by weight solids in odorless mineral spirits), polymer composite particles (spray dried powder), cobalt naphthenate, zirconium naphthenate, calcium naphthenate, Exkin-2 anti-skinning agent, odorless mineral spirits and tumbling overnight.

To form the let down, the grind was added to the premix and stirred for 5 minutes under bench stirring.

Medium-Oil Alkyd (pigmented white)—C

In a shot mill with glass shot, a grind of medium-oil alkyd resin (71% by weight solids in butyl acetate), polymer composite particles (spray dried powder), titanium dioxide pigment, dispersing agent and VM&P naptha solvent was mixed to better than 7 N.S. in Hegman scale.

The grind was added to medium-oil alkyd resin (71% by weight solids in butyl acetate), cobalt naphthenate, zirconium naphthenate, calcium naphthenate, methyl ethyl ketoxime and VM&P naptha solvent and stirred for 5 minutes under bench stirring.

Short-Oil Alkyd (pigmented white)—D

In a shot mill with glass shot, a grind of short-oil alkyd resin (75% by weight solids in methyl propyl ketone and toluene), polymer composite particles (spray dried powder), titanium dioxide pigment, Nuosperse 657 dispersing agent and methyl isobutyl ketone solvent was mixed to better than 7 N.S. in Hegman scale.

The grind was added to short-oil alkyd resin (75% by weight solids in methyl propyl ketone and toluene), cobalt naphthenate, zirconium naphthenate, calcium naphthenate, methylethyl ketoxime and methyl isobutyl ketone solvent and stirred for 5 minutes under bench stirring.

Short-Oil Alkyd (pigmented black)—E

In a shot mill with steel shot, a grind of short-oil alkyd resin (75% by weight solids in methyl propyl ketone and toluene), polymer composite particles (spray dried powder), Carbon black pigment, dispersing agent and methyl isobutyl ketone solvent was mixed to better than 7 N.S. in Hegman scale.

The grind was added to short-oil alkyd resin (75% by weight solids in methyl propyl ketone and toluene), cobalt naphthenate, zirconium naphthenate, calcium naphthenate, methylethyl ketoxime and methyl isobutyl ketone solvent and stirred for 5 minutes under bench stirring.

Short-Oil Alkyd (no pigment)—F

A short-oil alkyd resin (75% by weight solids in methyl propyl ketone and toluene), polymer composite particles (powder), methyl isobutyl ketone solvent, cobalt naphthenate, zirconium naphthenate, calcium naphthenate, methylethyl ketoxime and methyl isobutyl ketone solvent stirred together and then tumbled overnight.

Acrylic/Polyisocyanate (pigmented white)—G

A premix was made by adding together in a container Acryloid ® AU-946 (67% solids) acrylic resin, polymer composite particles (spray dried powder), methyl-n- amyl ketone solvent and BYK 300 slip and mar aid and tumbling overnight.

In a Cowles mixer, a grind of Acryloid® AU-946 (67% solids) acrylic resin, titanium dioxide pigment and methyl-n-amyl ketone solvent was mixed at 3000 rpm for 20 minutes.

To form the let down, the grind was added to the premix and stirred for 5 minutes. The Desmodur®

N-3300 isocyanate was then added and mixed for an additional 5 minutes.

Long-Oil Alkyd (pigmented white)—H

In a Cowles mixer, a grind of long-oil alkyd resin (90% solids in odorless mineral spirits), titanium dioxide pigment and biocide was mixed at 3000 rpm for 20 minutes.

A premix was made by adding together in a container long-oil alkyd resin (90% by weight solids in odorless mineral spirits), polymer composite particles (spray dried powder), cobalt naphthenate, zirconium naphthenate, Exkin-2 anti-skinning agent, Drymax drier, odorless mineral spirits and tumbling overnight.

To form the let down, the grind was added to the premix and stirred for 5 minutes under bench stirring.

TABLE 2.1

| | Long-Oil Alkyd (pigmented white) - A | | | | |
|---|---|---|---|---|---|
| | Paint Formulations | | | | |
| | A-0* | A-1-odl1 | A-2-odl1 | A-3-odl1 | A-4-odl1 |
| Grind | | | | | |
| long-oil alkyd resin (90% solids in odorless mineral spirits and xylol) | 115.7 | 115.7 | 115.7 | 115.7 | 115.7 |
| titanium dioxide pigment | 253.7 | 253.7 | 253.7 | 253.7 | 253.7 |
| odorless mineral spirits solvent | 20.3 | 20.3 | 20.3 | 20.3 | 20.3 |
| Premix | | | | | |
| long-oil alkyd resin (90% by weight solids in odorless mineral spirits and xylol) | 471.6 | 412.9 | 354.2 | 295.4 | 236.7 |
| polymer composite particles (spray dried powder) | — | odl1 | odl1 | odl1 | odl1 |
| level of polymer composite particles | 0 | 52.9 | 105.7 | 158.6 | 211.4 |
| cobalt naphthenate (12%) | 1.8 | 1.8 | 1.8 | 1.8 | 1.8 |
| zirconium naphthenate (12%) | 26.4 | 26.4 | 26.4 | 26.4 | 26.4 |
| Drymax drier accelerator/stabilizer | 1.1 | 1.1 | 1.1 | 1.1 | 1.1 |
| Extin-2 anti-skinning agent | 1.1 | 1.1 | 1.1 | 1.1 | 1.1 |
| odorless mineral spirits solvent | 64.9 | 69.6 | 74.3 | 79.0 | 83.7 |
| Aromatic 100 solvent | 18.4 | 19.6 | 20.7 | 21.9 | 23.1 |
| Weight ratio of composite polymer particles to resin solids | 0/100 | 10/90 | 20/80 | 30/70 | 40/60 |

TABLE 2.2

| | Long-Oil Alkyd (pigmented white) - B | | | | | |
|---|---|---|---|---|---|---|
| | Paint Formulations | | | | | |
| | B-0* | B-1-odl1 | B-2-odl1 | B-3-odl1 | B-4-odl1 | B-5-odl1* |
| Grind | | | | | | |
| long-oil alkyd resin (70% solids in odorless mineral spirits) | 160 | 160 | 160 | 160 | 160 | 142.9 |
| titanium dioxide pigment | 160 | 160 | 160 | 160 | 160 | 160 |
| Premix | | | | | | |
| long-oil alkyd resin (70% by weight solids in odorless mineral spirits) | 125.7 | 97.1 | 68.6 | 40 | 11.43 | 0 |
| polymer composite particles (spray dried powder) | — | odl1 | odl1 | odl1 | odl1 | odl1 |
| level of polymer composite particles | 0 | 20 | 40 | 60 | 80 | 100 |
| cobalt naphthenate (6%) | 1.67 | 1.67 | 1.67 | 1.67 | 1.67 | 1.67 |
| zirconium naphthenate (6%) | 3.67 | 3.67 | 3.67 | 3.67 | 3.67 | 3.67 |
| calcium naphthenate (4%) | 2.00 | 2.00 | 2.00 | 2.00 | 2.00 | 2.00 |
| Extin-2 anti-skinning agent | 0.3 | 0.3 | 0.3 | 0.3 | 0.3 | 0.3 |
| odorless mineral spirits solvent | 48.3 | 56.9 | 65.4 | 74 | 82.6 | 91.2 |
| Weight ratio of composite polymer particles to resin solids | 0/100 | 10/90 | 20/80 | 30/70 | 40/60 | 50/50 |

TABLE 2.3

| | Medium-Oil Alkyd (pigmented white) - C | |
|---|---|---|
| | Paint Formulations | |
| | C—O* | C-3-odl1 |
| Grind | | |
| medium-oil alkyd resin | 35.00 | 20.80 |

TABLE 2.3-continued

Medium-Oil Alkyd (pigmented white) - C

| | Paint Formulations | |
|---|---|---|
| | C—O* | C-3-odl1 |
| (85% by weight solids in butyl acetate) | | |
| polymer composite particles (spray dried powder) | — | odl1 |
| level of polymer composite particles | 0 | 17.69 |
| titanium dioxide pigment | 49.27 | 47.16 |
| dispersing agent | 1.25 | 1.20 |
| VM&P naptha solvent | 27.00 | 34.15 |
| Letdown | | |
| Above grind | 95.06 | 81.34 |
| medium-oil alkyd resin | 32.55 | 19.90 |
| (85% by weight solids in butyl acetate) | | |
| cobalt naphthenate (12%) | 0.22 | 0.12 |
| calcium naphthenate (6%) | 0.89 | 0.49 |
| zirconium naphthenate (18%) | 0.30 | 0.16 |
| methyl ethyl ketoxime | 0.10 | 0.06 |
| VM&P naptha solvent | 4.26 | 0.28 |
| Weight ratio of composite polymer particles to resin solids | 0/100 | 30/70 |

TABLE 2.4

Short-Oil Alkyd (pigmented white) - D

| | Paint Formulations | |
|---|---|---|
| | D—O* | D-3-odl1 |
| Grind | | |
| short-oil alkyd resin | 39.40 | 28.29 |
| (75% by weight solids in methyl propyl ketone and toluene) | | |
| polymer composite particles (spray dried powder) | — | odl1 |
| level of polymer composite particles | 0 | 14.99 |
| titanium dioxide pigment | 49.27 | 40.05 |
| dispersing agent | 1.17 | 0.95 |
| methyl isobutyl ketone solvent | 27.00 | 31.01 |
| Letdown | | |
| Above grind | 99.40 | 96.10 |
| short-oil alkyd resin | 36.23 | 15.29 |
| (75% by weight solids in methyl propyl ketone and toluene) | | |
| cobalt naphthenate (12%) | 0.22 | 0.12 |
| calcium naphthenate (6%) | 0.87 | 0.49 |
| zirconium naphthenate (18%) | 0.87 | 0.49 |
| methyl ethyl ketoxime | 0.10 | 0.06 |
| Weight ratio of composite polymer particles to resin solids | 0/100 | 30/70 |

TABLE 2.5

Short-Oil Alkyd (pigmented black) - E

| | Paint Formulations | |
|---|---|---|
| | E—O* | E-3-odl1 |
| Grind | | |
| short-oil alkyd resin | 54.89 | 26.85 |
| (75% by weight solids in methyl propyl ketone and toluene) | | |
| polymer composite particles (spray dried powder) | — | odl1 |
| level of polymer composite particles | 0 | 24.16 |
| Carbon black pigment | 3.18 | 3.18 |
| dispersing agent | 0.22 | 0.22 |
| methyl isobutyl ketone solvent | 31.07 | 32.10 |
| Letdown | | |
| Above grind | 76.00 | 61.60 |
| short-oil alkyd resin | 44.60 | 34.41 |
| (75% by weight solids in methyl propyl ketone and toluene) | | |
| cobalt naphthenate (12%) | 0.29 | 0.17 |
| calcium naphthenate (6%) | 1.14 | 0.67 |
| zirconium naphthenate (18%) | 1.14 | 0.67 |
| methyl ethyl ketoxime | 0.13 | 0.08 |
| methyl isobutyl ketone solvent | 0 | 5.20 |
| Weight ratio of composite polymer particles to resin solids | 0/100 | 30/70 |

TABLE 2.6

Short-Oil Alkyd (no pigment) - F

| | Paint Formulations | |
|---|---|---|
| | F—O* | F-3-odl1 |
| Grind | | |
| short-oil alkyd resin | 66.65 | 46.65 |
| (75% by weight solids in methyl propyl ketone and toluene) | | |
| polymer composite particles (spray dried powder) | — | odl1 |
| level of polymer composite particles | 0 | 15.00 |
| methyl isobutyl ketone solvent | 31.85 | 31.70 |
| cobalt naphthenate (12%) | 0.28 | 0.20 |
| calcium naphthenate (6%) | 1.10 | 0.77 |
| zirconium naphthenate (18%) | 0.75 | 0.52 |
| methyl ethyl ketoxime | 0.13 | 0.09 |
| Weight ratio of composite polymer particles to resin solids | 0/100 | 30/70 |

TABLE 2.7

Acrylic/Polyisocyanate (pigmented white) - G

| | Paint Formulations | | | | | | | |
|---|---|---|---|---|---|---|---|---|
| | G-0* | G-3-odl2 | G-3-odl3 | G-3-odl4 | G-3-odl5 | G-3-odl6 | G-3-odl7 | G-3-odl8 |
| Premix | | | | | | | | |
| Acryloid ® AU-946 acrylic resin (67% solids) | 115.4 | 76.0 | 76.0 | 76.0 | 76.0 | 76.0 | 76.0 | 76.0 |
| polymer composite particles (spray dried powder) | — | odl2 | odl3 | odl4 | odl5 | odl6 | odl7 | odl8 |
| level of polymer composite particles | 0 | 31.6 | 31.6 | 31.6 | 31.6 | 31.6 | 31.6 | 31.6 |
| Methyl-n-amyl ketone solvent | 51.9 | 64.8 | 64.8 | 64.8 | 64.8 | 64.8 | 64.8 | 64.8 |
| BYK-300 slip and mar aid | 0.14 | 0.14 | 0.14 | 0.14 | 0.14 | 0.14 | 0.14 | 0.14 |
| Grind | | | | | | | | |
| Acryloid ® Au-946 acrylic resin (67% solids) | 33.89 | 33.89 | 33.89 | 33.89 | 33.89 | 33.89 | 33.89 | 33.89 |
| Ti-Pure 200 R-960 | 89.8 | 89.8 | 89.8 | 89.8 | 89.8 | 89.8 | 89.8 | 89.8 |

TABLE 2.7-continued

| | Acrylic/Polyisocyanate (pigmented white) - G | | | | | | | |
|---|---|---|---|---|---|---|---|---|
| | Paint Formulations | | | | | | | |
| | G-0* | G-3-odl2 | G-3-odl3 | G-3-odl4 | G-3-odl5 | G-3-odl6 | G-3-odl7 | G-3-odl8 |
| titanium dioxide | | | | | | | | |
| Methyl-n-amyl ketone solvent | 10.72 | 10.72 | 10.72 | 10.72 | 10.72 | 10.72 | 10.72 | 10.72 |
| Desmodur ® N-3300 isocyanate | 47.9 | 42.7 | 42.7 | 42.7 | 42.7 | 42.7 | 42.7 | 42.7 |
| Weight ratio of composite polymer particles to resin solids | 0/0 | 30/70 | 30/70 | 30/70 | 30/70 | 30/70 | 30/70 | 30/70 |

TABLE 2.8

| | Long-Oil Alkyd (pigmented white) - H | |
|---|---|---|
| | Paint Formulations | |
| | H—0* | H-3-odl9 |
| Premix | | |
| long-oil alkyd resin (90% solids in odorless mineral spirits) | 109.37 | 111.10 |
| TiPure ® R-902 titanium dioxide pigment | 240.24 | 240.32 |
| biocide | 9.40 | 9.40 |
| odorless mineral spirits solvent | 28.96 | 29.39 |
| Grind | | |
| long-oil alkyd resin (90% by weight solids in odorless mineral spirits | 445.62 | 283.22 |
| polymer composite particles (spray dried powder) | — | odl9 |
| level of polymer composite particles | 0 | 152.42 |
| cobalt naphthenate (6%) | 3.34 | 3.39 |
| zirconium naphthenate (18%) | 8.34 | 8.47 |
| Exkin-2 anti-skinning agent | 1.95 | 1.98 |
| drier | 2.00 | 2.03 |
| Weight ratio of composite polymer particles to resin solids | 0/100 | 30/70 |

The following suffix designations were given to the paint formulations to indicate the weight ratio of polymer particles to film-forming resin solids:

| Designation | Weight ratio of polymer particles to film-forming resin solids |
|---|---|
| -0-* | 0/100* |
| -1- | 10/90 |
| -2- | 20/80 |
| -3- | 30/70 |
| -4- | 40/60 |
| -5-* | 50/50* |

*Note:
These designations are comparatives.

EXAMPLE 3

Applications Testing

Dispersibility Testing

Two different tests were performed to determine whether the polymer particles were dispersible in the film-forming polymer and solvent: viscosity and gloss.

Viscosity

The viscosity of each paint formulation was measured using an ICI cone and plate viscometer at a shear rate of about 10,000 second$^{-1}$ and a temperature of 25° C. The results are reported in centipoises in Table 3.1. The viscosity of each paint formulation containing polymer particles was compared to the viscosity of the same paint formulation containing no composite polymer particles. Substantial viscosity increases are unacceptable.

Gloss

Each paint formulation was cast at room temperature on a steel panel using a drawdown bar which gave a dried film thickness of:

| long-oil alkyds | 2.5 mil |
|---|---|
| medium- and short-oil alkyds | 1.5 mil |
| acrylic/polyisocyanate | 2.0 mil |

Each paint was allowed to dry for 2 weeks.
The gloss of each paint was measured using a micro TRI gloss reflectometer (BYK-Gardner GmbH) at 20°. The results are reported in Table 3.1 as the statistical mean of four measurements per sample. Higher gloss numbers indicate higher gloss.

Dry Time Test

Each paint formulation was cast at room temperature on a steel panel using a drawdown bar which gave a dried film thickness of:

| long-oil alkyds | 2.5 mil |
|---|---|
| medium- and short-oil alkyds | 1.5 mil |
| acrylic/polyisocyanate | 2.0 mil |

Each paint was allowed to dry for 15 minutes to permit solvent evaporation before being transfer to a constant temperature (25° C.) and humidity (50% relative humidity) room for testing.

Zapon Dry Time

The Zapon dry time for each coating was determined according to ASTM Test Method D-1640-69 section 5.3.3 using weights of 0 grams, 100 grams and 500 grams. The results are reported in hours in Table 3.1.

Circular Dry Time

The circular dry time for each coating was measured using a GARDCO drying time recorder, supplied by the Paul N. Gardner Company. Each paint formulation was drawn down, using a 10 mil square draw down bar, over iron phosphatized steel. Each test specimen was initially dried for two hours in a hood and then placed in a constant temperature (25° C.) and humidity (50% relative humidity) room for testing.

The results are reported in Table 3.1 as the time in minutes for the Teflon ball stylus no longer picked up paint film.

TABLE 3.1

| Paint Formulation | Viscosity (centipoise) | Dry Time Test Zapon (hours) 0 gram | 100 gram | 500 gram | Circular (minutes) | 20° Gloss |
|---|---|---|---|---|---|---|
| Comparative A-0 | 320 | — | — | — | 720 | 84 |
| A-1-odl1 | 340 | — | — | — | 630 | 78 |
| A-2-odl1 | 365 | — | — | — | 420 | 81 |
| A-3-odl1 | 440 | — | — | — | 390 | 82 |
| A-4-odl1 | 545 | — | — | — | 300 | 85 |
| Comparative B-0 | 860 | — | — | 8–24 | 900 | 72 |
| B-1-odl1 | 770 | — | — | 8–24 | 480 | 70 |
| B-2-odl1 | 710 | — | — | 8 | 420 | 67 |
| B-3-odl1 | 660 | — | — | 6 | 150 | 68 |
| B-2-osl1 | 630 | — | — | 4.5 | 150 | 71 |
| Comparative B-5-odl1 | 410 | — | — | 3.5 | 90 | 46 |
| Comparative C-0 | 538 | — | — | — | 370 | 76 |
| C-3-odl1 | 723 | — | — | — | 311 | 74 |
| Comparative D-0 | 265 | — | — | — | 90 | 84 |
| D-3-odl1 | 305 | — | — | — | 30 | 75 |
| Comparative E-0 | 653 | — | — | — | 118 | 89 |
| D-3-odl1 | 641 | — | — | — | 47 | 82 |
| Comparative F-0 | 111 | — | — | — | 111 | 100 |
| F-3-odl1 | 105 | — | — | — | 50 | 84 |
| Comparative G-0 | 190 | 3 | 6–22 | — | — | 87 |
| G-3-odl2 | 240 | — | 1.5 | — | — | 65 |
| G-3-odl3 | 200 | 1 | 3 | — | — | 78 |
| G-3-odl4 | 200 | — | 1.5 | — | — | 58 |
| G-3-odl5 | 200 | — | 1.5 | — | — | 65 |
| G-3-odl6 | 200 | — | 2 | — | — | 60 |
| G-3-odl7 | 200 | — | 2 | — | — | 60 |
| G-3-odl8 | 200 | — | 2 | — | — | 63 |

Note:
Paint Formulations D, E and F were tested for gasoline, salt-spray and humidity resistance. The incorporation of the composite polymer particles of the invention did not significantly reduce the gasoline, salt-spray and humidity resistance of the paint formulations as compared to the same-paint formulations which did not contain composite polymer particles.

Paint Formulations G was tested to determine the effect of incorporating the composite polymer particles of the invention on the pot life of the paint formulation. The paint formulation containing the composite polymer particles of the invention showed no significant increase in viscosity over time as compared to the paint formulation containing no composite polymer particles.

The dry time of each type of paint formulation (long-oil alkyd, medium-oil alkyd, short-oil alkyd and acrylic/polyisocyanate) was consistently reduced when the composite polymer particles of the invention were incorporated into the paint formulation as compared to the paint formulation which did not contain any composite polymer particles. This effect was seen at a level of from at least a weight ratio of composite polymer particles to film-forming resin solids of 10:90. Incorporation of composite polymer particles at levels greater than 40:60 reduced the gloss and increased the viscosity significantly.

EXAMPLE 4

Preparation of Comparative Particles

Comparative particles COMPA-COMPD are one-stage polymers which were prepared by a conventional redox emulsion polymerization process.

The quantity of each ingredient which was added is shown in Table 4.1. A monomer emulsion was prepared by mixing the appropriate monomers with water and sodium dodecyl benzene sulfonate (SDBS) according to Table 4.1. Water, ferrous sulfate heptahydrate ($FeSO_4 \cdot 7H_2O$ [0.1%]) and ethylenediaminetetraacetic acid tetrasodium salt (EDTA [1.0%]) were charged to the reaction kettle and heated to 65° C. A polymer seed was added. A catalyst cofeed and monomer emulsion were gradually added into the reaction kettle over 1.5 hours, maintaining the temperature at 65° C. The reaction kettle was held for 20 minutes. The reaction was then cooled to room temperature.

The polymer particles were then isolated either by spray drying or freeze drying:

Spray Drying

The polymer particles were isolated by spray drying using a Bowen Model BLSA laboratory spray drier. The inlet temperature was adjusted to 125° C. and then the feed rate was adjusted to give an outlet temperature of 55° C.

Freeze Drying

The polymer particles were isolated by freeze drying using a Labconca Freeze Dry 8 Model 75040. The freeze dryer was run at less than about 40° C. under a vacuum of less than about 25 microns (0.025 Torr) for 16–24 hours or until less than about 0.5% moisture was present. The material was then ground either in a high shear grinder or with a mortar and pestle.

The compositions and final properties of the binders are shown in Table 4.2.

TABLE 4.1

| | COMPA | COMPB | COMPC | COMPD |
|---|---|---|---|---|
| Kettle Charge | | | | |
| Water | 700 | 700 | 700 | 700 |
| $FeSO_4 \cdot 7H_2O$ [0.1%] | 17 | 17 | 17 | 17 |
| EDTA [1.0%] | 2.4 | 2.4 | 2.4 | 2.4 |
| Monomer Emulsion | | | | |
| Water | 700 | 700 | 700 | 700 |
| SDBS | 60 | 60 | 60 | 60 |
| BA | 1306 | 1306 | 1193.65 | 1165.56 |
| ALMA | 84.2 | 84.2 | 112.35 | 140.44 |
| MAA | 14.2 | 14.2 | 14.2 | 14.2 |
| Polymer seed | 20 | 20 | 20 | 20 |

TABLE 4.1-continued

|  | COMPA | COMPB | COMPC | COMPD |
|---|---|---|---|---|
| Catalyst Cofeed |  |  |  |  |
| t-BHP [0.95%] | 224 | 224 | 224 | 224 |
| IAA solution (1.85%) | 224 | 224 | 224 | 224 |

Notes:
BA butyl acrylate
ALMA allyl methacrylate
MAA methacrylic acid
IBMA isobutyl methacrylate
g grams
SDBS sodium dodecyl benzene sulfonate
EDTA ethylenediaminetetraacetic acid
IAA isoascorbic acid solution
$FeSO_4.7H_2O$ ferric sulfate heptahydrate

TABLE 4.2

| Comparative Particles | | | |
|---|---|---|---|
| Comparative Particles | Composition | $T_g$ (°C.) (calculated) | Isolation |
| COMPA | 93BA/6ALMA/1MAA | −49 | freeze dried |
| COMPB | 93BA/6ALMA/1MAA | −49 | spray dried |
| COMPC | 91BA/8ALMA/1MAA | −48 | spray dried |
| COMPD | 89BA/10ALMA/1MAA | −46 | spray dried |

EXAMPLE 5

Dispersibility of One Stage Particles

The dispersibility of polymer particles having only a single stage (comparative) was compared to the dispersibility of the composite polymer particles of the invention.

Long-oil alkyd paints (pigmented white) were prepared according Paint Formulations H (supra) containing either comparative polymer particles or the composite polymer particles of the invention. Each paint formulation was cast at room temperature on both an aluminum panel using a 10 mil drawdown bar and a sealed chart using a 3 mil Bird. Each paint was allowed to dry. The dispersibility of the comparative polymer particles and the composite polymer particles of the invention was qualitatively measured by the amount of grit in the final dried coating. Observations of any grit are reported in Table 5.1.

TABLE 5.1

| Polymer Particles | Observations | |
|---|---|---|
|  | Case on Aluminum | Cast on Sealed Chart |
| od11-fd | slight grit | very slight grit |
| od11-sd | slight grit | no grit |
| od19-fd | no grit | no grit |
| od9-sd | slight grit | very slight grit |
| COMPA | severe grit | severe grit |
|  | Note: not dispersible in paint formulaton | |
| COMPB | severe grit | severe grit |
|  | Note: not dispersible in paint formulaton | |
| COMPC | severe grit | severe grit |
|  | Note: not dispersible in paint formulaton | |
| COMPD | severe grit | severe grit |
|  | Note: not dispersible in paint formulaton | |

None of the comparative polymer particles have a second stage polymer. They were not dispersible in the paint formulation and form severe grit in the final dried coating. The paint formulations containing the composite polymer particles of the invention were easily formulated and produced, at the most, only slight grit in the final dried coating.

We claim:

1. A non-aqueous coating composition, comprising:
   (a) a film-forming resin;
   (b) a volatile organic liquid which is a solvent for the film-forming resin; and
   (c) at least one composite polymer particle,
      wherein the weight ratio of said composite polymer particles to said film-forming resin solids is from about 10:90 to about 40:60;
      wherein said composite polymer particles are from about 50% by weight to about 90% by weight a first stage polymer and from about 10% by weight to about 50% by weight a second stage polymer, based on the total weight of said composite polymer particle;
      wherein said first stage polymer is formed from at least one ethylenically unsaturated monomer, is insoluble in said film-forming resin and said volatile organic liquid and has a glass transition temperature of less than the glass transition temperature of said second stage polymer; and
      wherein said second stage polymer is formed from at least one ethylenically unsaturated monomer and has a glass transition temperature of greater than about 40° C.

2. The non-aqueous coating composition according to claim 1 wherein said first stage polymer has a glass transition temperature of less than about 0° C.

3. The non-aqueous coating composition according to claim 1 wherein said second stage polymer contains hydroxy functionality.

4. The non-aqueous coating composition according to claim wherein said film-forming resin is selected from the group consisting of an alkyd resin, a polyester resin, a polyurethane resin, an epoxy resin, a melamine resin, a urea resin, an isocyanate resin and an acrylic solution resin.

5. The non-aqueous coating composition according to claim 1 wherein said film-forming resin is an alkyd resin.

6. The non-aqueous coating composition according to claim 1 wherein said volatile organic liquid which is a solvent for the film-forming resin is selected from the group consisting of an aromatic hydrocarbon, an aliphatic hydrocarbon, an ester, a ketone and an alcohol.

7. The non-aqueous coating composition according to claim 1 wherein the weight ratio of said composite polymer particles to said film-forming resin solids is from about 20:80 to about 35:65.

8. The non-aqueous coating composition according to claim 1 wherein said composite polymer particle is from about 65% by weight to about 85% by weight said first stage polymer and from about 15% by weight to about 35% by weight said second stage polymer, based on the total weight of said composite polymer particle.

9. The non-aqueous coating composition according to claim 1 wherein said composite polymer particles are isolated as a dry powder.

10. The non-aqueous coating composition according to claim 9 wherein said composite polymer particles are isolated by a method selected from the group consisting of lyophilization, coagulation and subsequent drying, preferably, spray drying, freeze drying, tray drying and rotary drum drying.

11. The non-aqueous coating composition according to claim 9 wherein said composite polymer particles are isolated by spray drying.

12. A method of improving the drying time of a non-aqueous coating composition containing a film-forming resin and a volatile organic liquid which is a solvent for the the film-forming resin, where the improvement comprises:

incorporating composite polymer particles into the coating composition, wherein the weight ratio of said composite polymer particles to said film-forming resin solids is from about 10:90 to about 40:60;

wherein said composite polymer particles is from about 50% by weight to about 90% by weight a first stage polymer and from about 10% by weight to about 50% by weight a second stage polymer, based on the total weight of said composite polymer particle;

wherein said first stage polymer is formed from at least one ethylenically unsaturated monomer, is insoluble in said film-forming resin and said volatile organic liquid and has a glass transition temperature less than the glass transition temperature of said second stage polymer; and wherein said second stage polymer is formed from at least one ethylenically unsaturated monomer and has a glass transition temperature of greater than about 40° C.

13. The method according to claim 12 wherein said first stage polymer has a glass transition temperature of less than about 0° C.

14. The method according to claim 12 wherein said second stage polymer contains hydroxy functionality.

15. The method according to claim 12 wherein the weight ratio of said composite polymer particles to said film-forming resin solids is from about 20:80 to about 35:65.

16. The method according to claim 12 wherein said composite polymer particle is from about 65% by weight to about 85% by weight said first stage polymer and from about 15% by weight to about 35% by weight said second stage polymer, based on the total weight of said composite polymer particle.

17. The method according to claim 12 wherein said composite polymer particles are isolated as a dry powder.

18. The method according to claim 17 wherein said composite polymer particles are isolated by a method selected from the group consisting of lyophilization, coagulation and subsequent drying, spray drying, tray drying and rotary drum drying.

19. The method according to claim 17 wherein said composite polymer particles are isolated by spray drying.

20. The coating formed from the non-aqueous composition according to claim 1.

* * * * *